July 13, 1965  N. AKSNES ETAL  3,194,464
APPARATUS FOR BREAKING OFF AND REMOVING GLASS SHEETS
FROM AN ADVANCING BAND OF GLASS
Filed Nov. 13, 1961
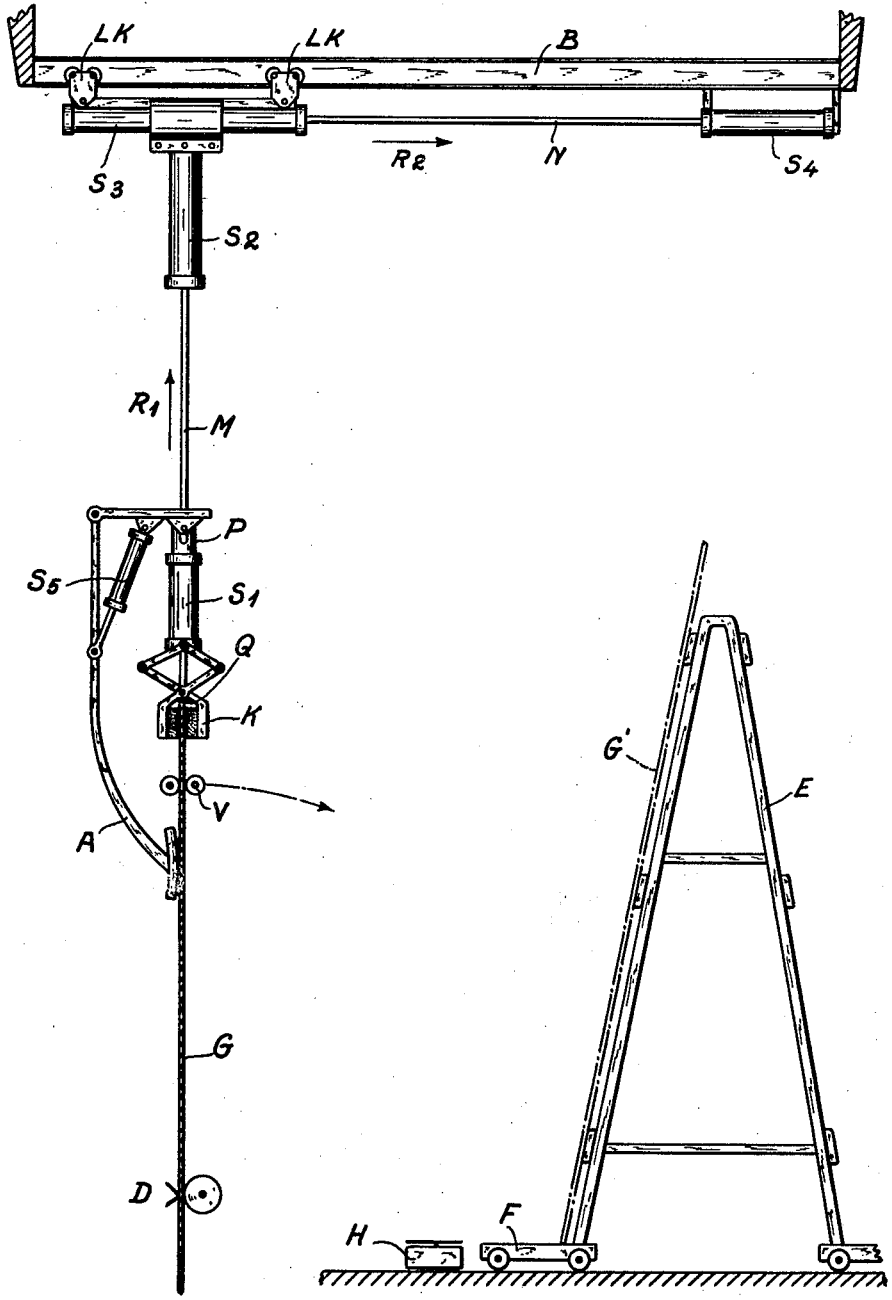

United States Patent Office 3,194,464
Patented July 13, 1965

3,194,464
APPARATUS FOR BREAKING OFF AND REMOVING GLASS SHEETS FROM AN ADVANCING BAND OF GLASS
Nils Aksnes, Drammen, Per Cappelen Smith, Slependen, and Öyvind Sunde, Drammen, Norway, assignors to Drammens Glassverk, Drammen, Norway
Filed Nov. 13, 1961, Ser. No. 151,948
10 Claims. (Cl. 225—96.5)

The present invention relates to a device for the automatic breaking and stacking of glass in machines adapted for producing window glass. Such a glass stacking operation previously has been carried out manually. There also exists automatic devices for such an operation. These automatic devices operate by severing the glass sheet at suitable intervals during lateral rotation of the upper part of the glass machine over an angle of about 90° by an overturning movement of the entire mechanism, whereupon the severed glass plates are moved to a horizontal position. Machines of the above type are provided with suction discs, for holding the plate, breaking it off and bringing it to a horizontal position.

Such known automatic devices have a substantial drawback in that they require much space. Furthermore, the mechanical devices in swung down position as well as the glass plates themselves which are removed in horizontal position occupy substantial floor area. The previously known automatic devices are furthermore mechanically complicated and expensive.

The object of the present invention is to provide a simple and space saving automatic machine for the breaking off and stacking of glass plates whereby said drawbacks are eliminated.

According to the invention this is obtained by providing a catching device, which catches the upper edge of the glass band and which is provided with means for lateral movement synchronized with a cutting device for carrying out usual crosswise cutting of the glass band in desired lengths, said device further comprising means for lowering the severed glass plate on a suitable support in substantial vertical position.

To provide a better understanding of the invention there is described below an embodiment diagrammatically disclosed in the drawing, A glass band G is continually drawn from a nozzle of a glass producing device (not shown) in a generally upward direction. In the plane of the glass band, there is arranged a pressure cylinder S1, which by hydraulic or compressed air can open and close the claw K. Such opening and closing is carried out by means of a suitable control which for example may comprise a valve or contact device arranged below the cylinder S1. When the upper edge of the glass band G engages the contact Q, said claw is closed to grip the edge of the band G. The cylinder S1 is secured to the end of a piston rod M cooperating with a cylinder S2, which is synchronized such that the cylinder S1 and the claw K are lifted at the same speed that the glass band G is moved upwards. In the connection P between the piston rod M and the cylinder S1, there is preferably provided play which is obtained by a pivot accommodated in an oblong hole. This connection suitably can contain also (not shown) contact means for the control of the automatic functioning at the same time as the desired compliance is obtained. Thus where the play is taken up in the connection P by the upward movement of the claws gripping the glass band, the contact means is energized to in turn energize cylinder S2 to raise the claws and the cylinder S1 therewith.

When the glass band G together with the above described device is lifted up in a vertical direction R1 until a desired length of the upper part of the glass band has reached the cutting device D, the glass band is cut in a way known per se to leave a vertically suspended glass plate in the claw K. Synchronized with this operation, the cylinder S3 is energized by means of suitably located switches (not shown) to provide lateral movement in the direction indicated by the arrow R2. Said cylinder S3 is suspended from a travelling crab LK moving along the beam B.

Said lateral movement transfers the plate in substantially vertical position towards the rack E. The cylinder S2 now acts by means of switch (not shown) to lower the glass plate onto the contact device H. This device gives a pulse to the cylinder S4, when the plate is lowered on device H which cylinder causes movement of the piston N in the direction R2 to bring the glass plate towards the rack E. A separate (not shown) contact on the cylinder S4 provides a concurrent lowering movement of the cylinder S2, and the glass plate is brought down onto the support F. A contact in the connection P releases the claw K when the play is taken up in the connection P.

At this time and by virtue of the contact in the connection P, the cylinder S5 operates and moves the lever A so that a pad arranged on the free end thereof supports and simultaneously pushes the glass plate in place in a somewhat oblique position against the rack E as indicated in dotted lines G'. Finally the contact in the connection P provides a return of the entire apparatus to its initial position ready to receive another glass plate.

The rack E is preferably symmetrical about a vertical plane and thus can be used for stacking of glass plates on both sides. The rack occupies a minimum of space while at the same time it can accommodate a great number of glass plates, which as will be understood, are stacked and transported in substantially vertical position.

To ensure that the claw K engages the glass band properly, the upper part of the band preferably is guided by means of a pair of rollers V of which one is swingable as indicated by the arrow when the glass band is severed and swings out as above described.

It will be understood that the device according to the invention may be modified without departing from the spirit of the invention. What is essential is that the glass band be gripped at its upper edge and fed upwardly to provide a desired length of the glass band whereupon the band is cut by a relatively small lateral movement which brings the severed glass plate in position for stacking in a substantially vertical rack.

We claim:
1. Apparatus for severing glass plates from a glass band which is continuously fed upwardly and for stacking the thusly severed plates, said apparatus comprising gripper means for gripping the edge of the advancing glass band along an upper edge thereof, means supporting said gripper means for upward movement at the same speed as the advancing band, cutter means located below the gripper means adjacent the glass band to sever the band and form a plate, means for moving the gripper means laterally to cause the gripped plate which is substantially vertically suspended by the gripper means to be moved laterally in fixed attitude, rack means having a surface which is slightly vertically inclined, said rack means including a support below said surface, means for moving the gripper means to rest the glass plate in said fixed attitude on the support of the rack means, means for releasing the gripper means to allow the glass plate to rest freely on the support, means for exerting a force on the glass plate as the same rests freely on the support to cause the glass plate to tilt towards said slightly inclined surface of the rack means and be supported thereby, and means for returning the gripper means to the original position thereof.

2. Apparatus for severing glass plates from a glass band which is continuously fed upwardly and for stacking the thusly severed plates, said apparatus comprising gripper means for gripping the edge of the advancing glass band along an upper edge thereof, means supported for horizontal movement, a pair of hydraulic cylinders supported from the latter means and movable therewith, said cylinders extending respectively horizontally and vertically, a piston rod extending vertically from said vertically oriented cylinder and supporting said gripper means for upward and downward movement, said piston rod being adapted for movement at a speed synchronized with that of the advancing glass band to cause the gripper means to move upwardly with the glass band at the same rate of speed thereof, cutter means located below the gripper means adjacent the glass band for servering the latter to form a plate which is vertically suspended by the gripper means, said horizontal cylinder including a horizontally extending piston to which the cylinder is movable to cause horizontal movement of the means from which the horizontal cylinder is supported to in turn cause horizontal movement of the gripper means, said horizontal movement of the gripper means being operative to horizontally displace the glass plate which is vertically suspended by the gripper means in fixed attitude, rack means having a surface which is slightly vertically inclined, said rack means including a support below said surface, said gripper means being lowered to rest the suspended glass plate in said fixed attitude on the support of the rack means by movement of the piston rod in the vertically oriented cylinder, means for releasing the gripper means to allow the glass plate to rest freely on the support, means for exerting a force on the glass plate as the same rests freely on the support to cause the glass plate to tilt towards said slightly inclined surface of the rack means and be supported thereby, said gripper means being adapted for being returned to the original position thereof, for once again gripping the end of the advancing glass band, by movement of the respective pistons within the associated cylinders.

3. Apparatus as claimed in claim 2 wherein the gripper means includes a pair of jaws supported for movement towards and away from one another, a cylinder for controlling movement of said jaws, and a contact which is adapted for being engaged by the edge of the glass band for energizing the cylinder of the gripper means to close the jaws to grip the glass band.

4. Apparatus as claimed in claim 2 wherein the means for exerting a force on the glass plate comprises a pivotally supported lever having a free end located adjacent the glass plate and a hydraulic cylinder and piston arrangement coupled to said lever to pivotally move the same to cause the free end of the lever to contact the glass plate and exert a force thereon.

5. Apparatus as claimed in claim 2 comprising a pair of guiding rollers located above said cutter means and below the gripping means for guiding the glass band to the gripping means, one of said rollers being located to a side of the band which is opposite that to which the force is applied, said one roller being movably supported for being moved away from the glass plate to allow the same to be moved horizontally for being deposited onto the slightly inclined surface of the rack means.

6. Apparatus as claimed in claim 3 wherein the means for releasing the gripper means comprises a connection having play between the vertically oriented piston and the gripper means, said connection including a pin movable in an elongated opening such that with said glass plate gripped by said gripper means and deposited onto said support said pin moves in said opening, and contact means adapted for being contacted by the pin to energize the cylinder of the gripper means to open the jaws of the gripper means and release the glass plate therefrom.

7. Apparatus as claimed in claim 2 comprising a contact device located adjacent the support of the rack means, and on which the glass plate is initially deposited, a further hydraulic cylinder associated with the lateral piston for causing movement of the means which is supported for horizontal movement, the latter cylinder being energized with said glass plate resting on the contact device to then cause the glass plate to be horizontally shifted to the support of the rack means.

8. Apparatus as claimed in claim 2 wherein said rack means includes a symmetrical rack having symmetrical slightly vertically inclined surfaces.

9. Apparatus as claimed in claim 2 wherein said means supported for horizontal movement includes traveling crabs supporting said vertical and horizontally disposed cylinders.

10. Apparatus as claimed in claim 9 comprising a horizontal beam on which said crabs are movably supported.

References Cited by the Examiner

UNITED STATES PATENTS

| | | | |
|---|---|---|---|
| 1,922,327 | 8/33 | Redshaw | 225—93.5 |
| 1,996,387 | 4/35 | Owen | 225—96.5 |
| 2,111,393 | 3/38 | Gaskell | 225—96.5 |
| 2,310,403 | 2/43 | Dice | 65—174 |
| 2,378,091 | 6/45 | McCormick | 225—2 |
| 2,508,017 | 5/50 | Echter et al. | 225—2 |
| 2,560,305 | 7/51 | Ramain | 225—2 |
| 2,628,453 | 2/53 | Nye | 225—103 |
| 2,705,390 | 4/55 | Denlow | 225—2 |

FOREIGN PATENTS

| | | |
|---|---|---|
| 586,810 | 11/59 | Canada. |
| 550,880 | 5/32 | Germany. |
| 608,392 | 1/35 | Germany. |
| 650,177 | 2/51 | Great Britain. |
| 690,262 | 4/53 | Great Britain. |

ANDREW R. JUHASZ, *Primary Examiner.*

RAPHAEL M. LUPO, WILLIAM W. DYER, Jr.
*Examiners.*